March 6, 1962 P. G. WOLFE 3,024,305

COINCIDENCE CIRCUIT WITH MEANS TO PREVENT SIGNAL DISTORTION

Filed Aug. 21, 1959

INVENTOR.
PAUL G. WOLFE
BY
Nelson E. Kimmelman
ATTORNEY

United States Patent Office 3,024,305

Patented Mar. 6, 1962

3,024,305

COINCIDENCE CIRCUIT WITH MEANS TO PREVENT SIGNAL DISTORTION

Paul G. Wolfe, Oreland, Pa., assignor, by mesne assignments, to Philco Corporation, Philadelphia, Pa., a corporation of Delaware Filed Aug. 21, 1959, Ser. No. 835,302
12 Claims. (Cl. 178—5.4)

Figure 1:
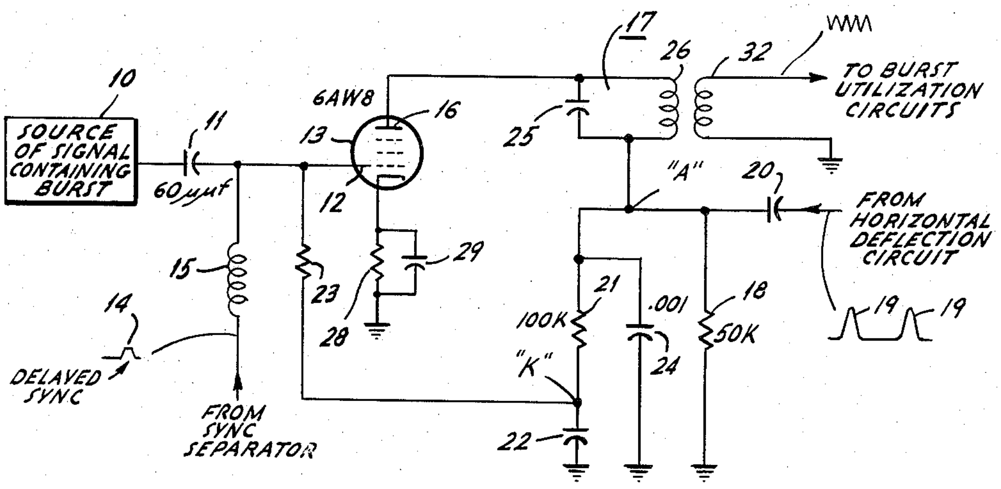

This invention relates to gating circuits and in particular to burst separation circuits used for color television receivers.

The color television system adopted for U.S. commercial broadcasting specifies that the transmitted signal shall contain a "burst" comprising about six or seven cycles of a sinusoidal wave at about 3.58 mc., the frequency of the subcarrier, on the "back porch" of the horizontal blanking pulse. The phase of this subcarrier furnishes the reference phase for the color information demodulation circuits at the receiver and if, in the reception of "burst," its phase is distorted the demodulation circuits cannot function properly and color reproduction errors will be evident in the image. Usual burst extraction circuits having employed coincidence circuits employing a tube to which the incoming signal, or a certain frequency range thereof, is applied along with at least one pulse occurring during the back-porch interval. The gating pulse renders the tube conductive substantially only during the "back-porch" interval so that the burst only is extracted and applied to demodulation circuits.

It has been found that such circuits have not always performed satisfactorily because the amplitude of the gating pulse, which often consists of a delayed horizontal synchronizing pulse, is not constant as received at the receiver. Hence, if its amplitude is abnormally large the electrode of the tube to which it is applied may draw current and as a result the phase of the burst passed by the gated tube will be subjected to distortion thereby causing image color errors.

It would appear that resort to conventional methods of clamping the potential on the electrode to which the gating pulse is applied to a maximum value would prevent the drawing of current by that electrode but in practice such is not the case. This is so because any small change in the value of the B+ voltage will be reflected as a change in the clamp voltage and, besides, the clamp voltage is ineffectual to prevent overdrive. Furthermore, since the so-called "automatic chroma control" circuits may not regulate the amplitude of the burst perfectly, the burst variations may drive the electrode to which it is supplied into conduction thereby causing distortion.

Accordingly it is an object of the present invention to provide a signal extraction circuit which prevents the introduction of phase changes in the extracted signal.

Another aim of the invention is to provide a gated signal extraction circuit in which amplitude changes in the gate pulse do not cause distortion in the phase of the signal to be extracted.

Still another object of the present invention is to provide an improved burst extraction circuit which is relatively noise immune and does not distort the phase of the signal to be extracted.

Another object of the invention is to provide an improved burst extraction circuit which is effective in extracting the burst without introducing phase distortion and without requiring a clamp circuit to be associated therewith.

These objects, as well as others which will appear herein, are achieved in accordance with my invention by providing a circuit containing a tube to an electrode of which the signal including burst and a gating pulse are both applied. I further provide that when the current through the tube commences to increase because of increased amplitude of the burst and/or the gating pulse a negative feedback voltage is developed which effectively biases the said electrode more negatively so as to prevent it from going positive and thus drawing current.

In a preferred form of my invention I provide for a tube such as a pentode to whose control grid the chrominance components and delayed horizontal sync pulses are fed. The plate is not connected to B+ but rather is connected to a source of the horizontal flyback signal and also to a storage circuit having a time constant longer than the time required to scan one line of the image. A connection is made from the storage circuit to the control grid. The tube parameters are so chosen that only when the delayed sync pulse and the horizontal flyback signal are supplied simultaneously to the tube will it conduct thereby passing burst. However, any increase in the amplitude of the sync pulse in the positive direction causes increased plate current to flow in the storage circuit thereby generating a correspondingly negative feedback signal at the plate. This feedback signal is applied to the control grid to make the average bias on the latter grid more negative thereby rendering unlikely the possibility that the latter will draw grid current.

FIGURE 1 is a circuit diagram illustrating one form of my invention; and

Figure 2:
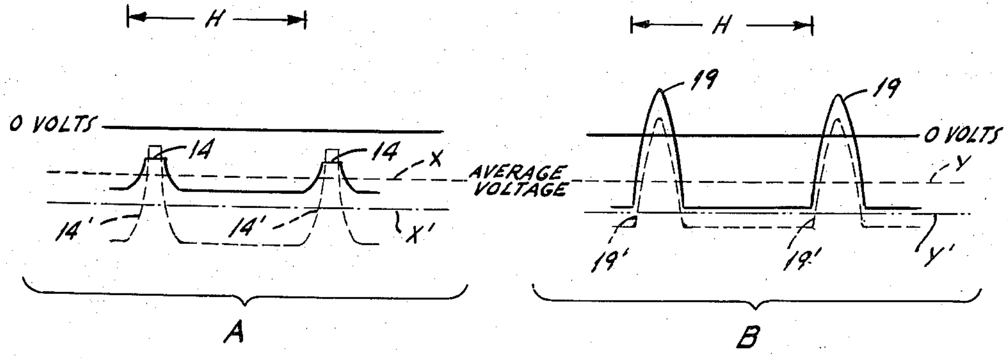

FIGURE 2 comprises a number of curves illustrating operating conditions in the circuit of FIG. 1.

Referring now to FIG. 1, a preferred form of my invention is shown as employed in connection with a color television receiver, although it should be borne in mind that it has utility in many other gating circuits in which it is desired to prevent the control grid from drawing current. The form of the invention illustrated employs "double gating," i.e., the delayed sync pulse is applied to one electrode and the flyback pulse to another. Since it is necessary for the flyback signal to be applied before the tube will conduct, any noise or chrominance information in the input signal in the intervals between successive horizontal sync pulses is prevented from getting through the burst separator. However, since the occurrence of the flyback pulse is dependent upon the setting of the "horizontal hold" control the delayed horizontal synchronizing pulse, which is not subject to any appreciable time variations, is used as a conjunctive gating signal. It should be understood that the values of the components illustrated are only intended to indicate one possible circuit which has been used in connection with the invention, and they are not intended to be limiting or restrictive in any way.

A source 10 supplies a signal containing the burst component via the coupling capacitor 11 to the control electrode 12 of an electron discharge device 13 such as the pentode 6AW8 shown. In practice it is preferred that the source 10 supply just the chrominance components of the composite color video signal, which lie in the approximate frequency range 2–4 mc., inasmuch as it is desired that the burst amplitude be relatively high when separated from the signal. Another reason why it is desirable to supply chrominance components rather than the composite color video signal to the control grid 12 is that the phase of the separated burst should be as representative as possible of the phase of the subcarrier components when demodulated, so that it should be extracted as close as possible to the demodulation stages. An RF choke 15 shunts the control grid 12 and is resonant to the frequency of the burst, i.e., 3.58 mc. This choke permits the burst to be applied to the burst utilization circuits with maximum amplitude and also serves as a conduit for the application of horizontal synchronizing pulses 14 which have been delayed somewhat so that they coincide with the "back porch" interval. In practice there is often sufficient delay introduced in the sync separation circuit and elsewhere to obviate the need for additional delay.

To the plate 16 of the tube 13 a resonant circuit 17 is connected consisting of an inductance 26 and a capacitance 25. The circuit 17 resonates at 3.58 mc. and is in series with a resistor 18 which serves to establish the voltage on the plate when current is drawn through the tube. Connected to the junction of the tank circuit 17 and the resistor 18 which is indicated as "A" is a lead from the horizontal deflection circuit which supplies to the plate via the coupling capacitor 20 the horizontal retrace pulses 19. As mentioned previously the potential on the plate 16 is insufficient in the intervals between the pulses 19 to permit the tube 13 to pass current so that noise or chrominance signals cannot pass through at those times.

In accordance with my invention I provide a circuit between the plate 16 and the grid 12 for supplying to the grid 12 a negative feedback voltage whose amplitude is a function of the current passing through the tube 13 which in turn is a function of the signal on the grid 12. The tube 13 may be considered to be operating as a grid-controlled rectifier. The feedback circuit consists primarily of the resistor 21 and the condenser 22 which conjunctively constitute a storage circuit. This circuit serves to filter the flyback pulses 19 to produce at the junction K a relatively constant negative bias voltage whose negative amplitude is an inverse function of the signal on control grid 12. This negative voltage effectively prevents the potential on the grid 12 from exceeding zero bias level and drawing current and thus distorting the phase of the extracted burst which will appear in the output circuit across tuned circuit 17.

The circuit of FIG. 1 also includes a cathode-current limiting resistor 28 which is by-passed by condenser 29. The condenser 24 has a capacitive reactance value at 3.58 mc. which is very low to permit the maximum burst amplitude to be developed across the tank circuit 17 since there is effectively no other appreciable impedance (at 3.58) in the anode load circuit. This condenser also by-passes any RF around the time-constant circuit so that the latter does not develop any A.-C. component that would cause unwanted fluctuations in the bias voltage developed therein, and so that fluctuations in the time constant circuit will not be introduced into the tank circuit 17. The coil 32 which is inductively coupled to the coil 26 (which may be the secondary of a transformer) is also coupled to appropriate burst utilization circuits (not shown) such as a phase comparison device which develops an error voltage to control a reactance tube across the reference oscillator, or a "ringing" type of reference signal generator.

FIGURE 2 is a group of waveforms which illustrate various operating conditions of the circuit and will now be used in explaining the operation of the circuit in more detail. Part A shows the horizontal sync pulses 14 applied to the control grid 12, the average voltage being indicated by broken line X. When the pulses 14 occur, the tube will, if the flyback pulses 19 shown in Part B occur simultaneously, pass a given amount of current.

The pulses 19 are shown in Part B as they appear at junction "A" (FIG. 1), assuming no other signal is applied to the tube 13. The application of the flyback pulses 19 (whose average is indicated by line Y) will cause the RC circuit (21, 22) to charge up and there will be applied to the grid 12 as a bias voltage the difference between the zero voltage level and this average value.

In the event that the amplitude of the sync pulses increases, as shown by pulses 14' in Part A, more current will be drawn by the tube so that there is a relatively lower resistance than before in series with the RC circuit. Under these conditions the flyback pulses will have a new lower level as shown by pulses 19' (Part B) whose average is then reduced to the level shown by the broken line Y'. The actual bias on the grid 12, which formerly was the difference between the zero volt level and the line Y, now becomes the difference between the zero voltage level and the line Y'. It will be noted that this bias is more negative than formerly so that, although the pulses 14' make excursions in the positive-going direction which are considerably larger than those made by pulses 14, the grid 12 becomes biased more negatively than it was previously so that there is no possibility of the pulses 14' causing the grid 12 to draw current. It will also be noted that the averages of the sync and flyback pulses respectively (lines X' and Y') are always lower than the zero voltage level by the same amount.

The invention as illustrated in the form shown in FIG. 1 includes an RC storage circuit 21, 22 in series with the tank circuit 17 and the plate. However, it is not absolutely essential that this particular arrangement be used since, for example, the flyback pulses could be applied to the plate 16 by way of a choke in series with a capacitor and the tank circuit 17 could be connected to the plate 16 via a coupling capacitor. With this arrangement the resistor 18 could be connected to the plate 16 and to ground in parallel with the series RC circuit 21 and 22. There are, of course, other ways of connecting the storage circuit in parallel with the tank circuit 17 but it should be understood that they are encompassed within the inventive concept claimed herein.

In the form of the invention shown in FIG. 1 one series of gating pulses is applied to the plate whereas the other is applied to the control grid together with the chrominance components. However, the invention may be used in a system in which the flyback pulses are applied not to the plate but to another electrode, i.e. the screen or suppressor electrode. In such a case the plate could be connected to B+ through a tank circuit resonant to the burst frequency and the flyback pulses could be applied via a coupling condenser to the screen grid. A time constant circuit of the type shown in FIG. 1 could be connected from the screen to the control grid to which the chrominance components and the delayed horizontal sync are applied. Thus, the burst would be extracted in the plate circuit and the feedback voltage would be developed in the time constant circuit between the screen grid and the control grid.

While the invention has been explained in terms of double gating in which both horizontal sync and horizontal flyback are used to gate the burst, it is also possible to employ systems in which either the sync pulse or the flyback pulse alone is used. For example, horizontal sync could be applied to two different electrodes, if desired.

However, these and many other variations are possible without in any way departing from the central nature of the invention which has as one of its principal features the provision of a negative feedback circuit responsive to variations in the current in the tube. The feedback circuit develops a negative voltage that is applied to bias the electrode to which the burst and horizontal sync pulse are applied more negatively as the amplitude of either or both increases thereby preventing the latter electrode from drawing current and introducing distortion into the phase of the burst signal.

It is also possible to employ the invention in still other circuits, i.e., those in which the points of application of the sync and flyback are reversed, i.e., the flyback is applied, with proper amplitude, to the control electrode whereas sync is applied to the plate (or screen).

It will be understood that other applications of the apparatus shown herein and other forms of the invention may ocur to those skilled in the art without departing from the scope of the invention as claimed herein. Consequently I desire the scope of this invention to be limited only by the claims herein.

I claim:

1. A coincidence circuit comprising: an electron discharge device having a cathode and first and second electrodes, means for supplying to said first electrode an input signal having a component which recurs during predetermined intervals and is subject to variations in amplitude, means for applying a gating signal to said first electrode substantially only during said intervals, said gating signal being subject to relatively wide variations in amplitude in a direction tending to cause increased current to flow through said device, and means coupled to said first and second electrodes for feeding back to said first electrode a voltage for preventing said first electrode from drawing current despite said amplitude variations of said component and of said gating signal.

2. In combination: an electron discharge device having a cathode and first and second electrodes, means for supplying to said first electrode an input signal having a component which recurs during predetermined intervals, means for applying a positive-going signal to said first electrode only during said intervals thereby tending to cause said device to pass more current, means coupled to said second electrode for producing a negative signal in response to said increase in current, and means for applying said negative signal to said first electrode thereby substantially preventing said first electrode from drawing current despite relatively large amplitude variations of said component and of said positive-going signal.

3. A coincidence circuit comprising: an electron discharge device having a cathode, a first electrode to which a negative potential is normally supplied and a second electrode to which a positive potential is normally supplied, means for supplying to said first electrode an input signal having a component which recurs during predetermined intervals, means for applying a positive-going signal to said first electrode substantially only during said intervals whereupon said device passes more current, means coupled to said second electrode for developing a negative signal in response to said increase of current, and means for applying said negative signal to said electrode thereby substantially preventing said first electrode from drawing current despite relatively large positive-going excursions of the amplitude of said component and of said positive-going signal.

4. A coincidence circuit comprising: an electron discharge device having a cathode, an anode, and a control electrode, means for applying to said control electrode an input signal which recurs regularly during selected intervals, first means for applying to said anode a first positive-going signal occurring substantially only during said intervals, second means for applying to said control electrode a second positive-going signal which occurs substantially only during said intervals, and means coupled to said first and second means for preventing said control electrode from drawing current despite relatively large variations in the amplitude of said component and of said second signal.

5. A coincidence circuit comprising: an electron discharge device having a cathode, an anode and a control electrode, means for applying to said control electrode a composite signal having a regularly recurrent component, first means for applying to said control electrode a first positive-going signal which occurs substantially only in the intervals in which said component occurs, second means for applying to said anode a second positive-going signal which occurs substantially only during the intervals in which said component occurs, and means coupled to said first and second means for maintaining a negative bias on said control electrode of such a value as substantially to prevent said latter electrode from drawing current despite relatively large positive-going excursions of the amplitude of said component and of said second signal.

6. A coincidence circuit comprising: an electron discharge device having a cathode, an anode and a control electrode, means for applying to said control electrode a composite signal having a component which recurs regularly during selected intervals, first means for applying to said control electrode a first positive-going signal substantially only during said intervals, second means for applying to said anode a second positive-going signal during said intervals, and means including an electronic storage circuit coupled to said first and second means for maintaining a negative bias on said control electrode of such a value as substantially to prevent said latter electrode from drawing current despite relatively large positive-going excursions of said component and of said first signal.

7. A coincidence circuit comprising: an electron discharge device having a cathode, an anode and a control electrode, means for applying to said control electrode a composite signal having a component which recurs regularly during selected intervals, first means for applying to said control electrode a first positive-going signal substantially only during said intervals, second means for applying to said anode a second positive-going signal substantially only during said intervals, and means including an electrical storage circuit arranged in series between said control electrode and said anode for maintaining a negative bias on said control electrode of such a value as substantially to prevent said control electrode from drawing current despite relatively large positive-going excursions of said component and of said first signal.

8. The coincidence circuit according to claim 7 wherein said electrical storage circuit has a time constant appreciably longer than the interval between successive occurrences of said recurrent component.

9. A coincidence circuit comprising: an electron discharge device having a cathode, an anode and a control electrode, means for applying to said control electrode a composite signal having a component which recurs during predetermined intervals, first means for applying to said control electrode a first positive-going signal substantially only in said intervals, second means for applying to said anode a second positive-going signal substantially only in said intervals, and means including an electrical storage circuit substantially in parallel with said anode and coupled to said control electrode for maintaining a negative bias on said control electrode of such a value as substantially to prevent said control electrode from drawing current despite relatively large positive-going excursions of said component and of said first signal.

10. The coincidence circuit according to claim 9 wherein said electrical storage circuit has a time constant appreciably longer than the interval between successive occurrences of said recurrent component.

11. A burst separation circuit comprising: an electron discharge device having a cathode, an anode and a control electrode, means for applying to said control electrode the chrominance components including burst of a received color television signal, first means for applying to said control electrode horizontal synchronizing pulses sufficiently delayed as to occur substantially only during the interval in which said burst occurs, second means for applying to said anode positive-going horizontal retrace pulses, an electronic storage circuit coupled to said anode and to said control electrode having a time constant appreciably longer than the interval between successive ones of said delayed synchronizing pulses, means whereby said storage circuit maintains a negative bias on said control electrode of such a value as substantially to prevent said control electrode from drawing current despite relatively large positive-going excursions of said component and of said delayed synchronizing pulses, and means coupled to said anode for extracting substantially only said burst component.

12. A burst separation circuit for a color television receiver comprising: an electron tube having a cathode, an anode and a control electrode, a source of an input signal containing the standard burst of the color subcarrier, means for applying said input signal to said control electrode, means for applying to said control electrode positive-going horizontal synchronizing pulses which have been delayed sufficiently so that they substantially coincide with the intervals during which said burst appears in said signal, a resonant circuit coupled to said anode which is tuned to the frequency of said burst, an electronic storage circuit coupled to said tuned circuit comprising a resistance and a capacitor in series, said resistor and capacitor having a time constant appreciably longer than the interval between successive ones of said delayed synchronizing pulses, means for applying positive-going horizontal retrace pulses to said anode via said resonant circuit, and a resistive connection between the junction of said resistor and capacitor and said control electrode for applying to said control electrode a negative voltage whose amplitude is an inverse function of the amplitude of the signals applied to said control electrode, said negative voltage having a value which is effective to substantially prevent said control electrode from drawing current when said burst and said delayed synchronizing pulses attain abnormally high positive-going amplitude values.

References Cited in the file of this patent

UNITED STATES PATENTS

| | | |
|---|---|---|
| 2,586,957 | Keizer | Feb. 26, 1952 |
| 2,892,018 | Baugh | June 23, 1959 |